United States Patent [19]
Lanni et al.

[11] Patent Number: 5,114,170
[45] Date of Patent: May 19, 1992

[54] TRAILER COUPLING GUIDE

[76] Inventors: Joseph Lanni; Ruth Lanni, both of 9094 Salsbury Dr., Brooksville, Fla. 34613

[21] Appl. No.: 647,103
[22] Filed: Jan. 29, 1991
[51] Int. Cl.⁵ .............................................. B60D 1/06
[52] U.S. Cl. .................................... 280/477; 280/511
[58] Field of Search ............ 280/477, 511, 507, 478.1, 280/508

[56] References Cited
U.S. PATENT DOCUMENTS 4,254,968  3/1981  DelVecchio ........................ 280/477
4,903,978  2/1990  Schrum, III ........................ 280/477

Primary Examiner—Mitchell J. Hill
Attorney, Agent, or Firm—Joseph C. Mason, Jr.; Ronald E. Smith

[57] ABSTRACT

A device that facilitates the coupling of a trailer to a vehicle that tows the trailer. The device enables a single unaided individual to back a vehicle equipped with a hitch device of the type having a hitch ball into a trailer tongue coupling of the type having a socket that receives the hitch ball. The bottom of an angled deflection plate that is wide at its leading end and narrow at its trailing end drives the hitch ball downwardly, compressing the vehicle's springs, as the vehicle backs up. Guide members that depend from opposite edges of the deflection plate converge toward one another and constrain the hitch ball to enter into an opening formed in the device that is in registration with the socket. The vehicle's springs then urge the hitch ball upwardly so that the ball extends through the opening and into the socket.

8 Claims, 2 Drawing Sheets

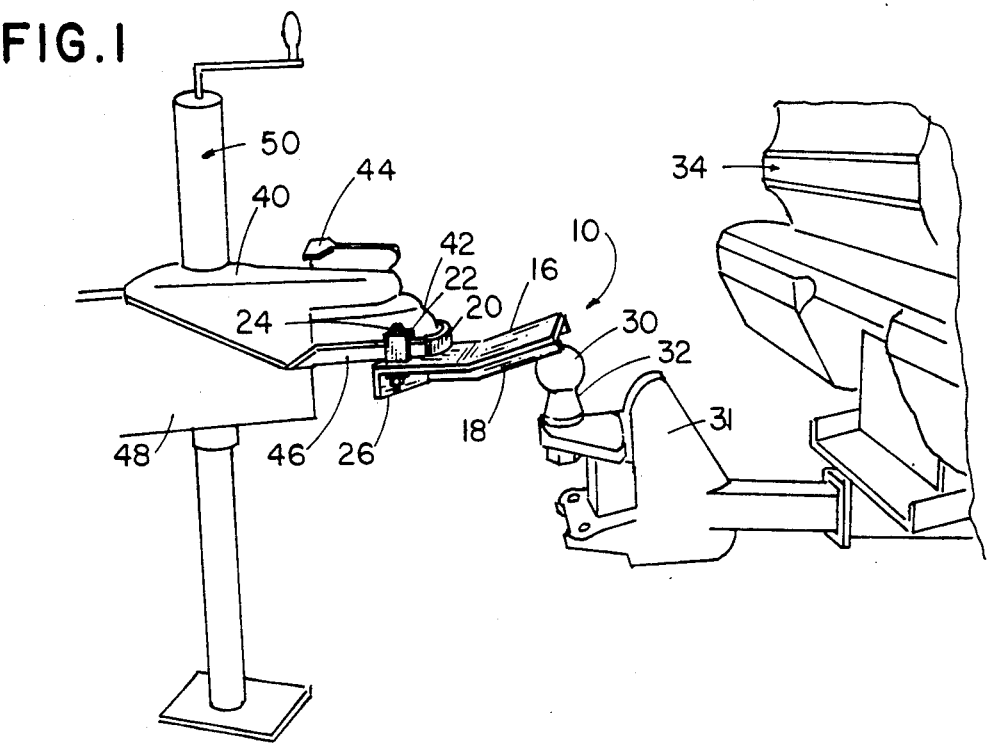
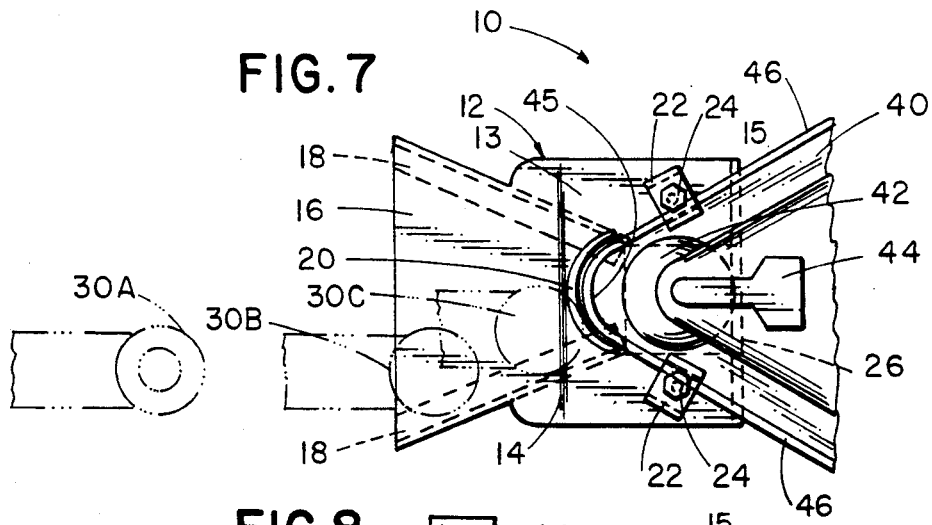
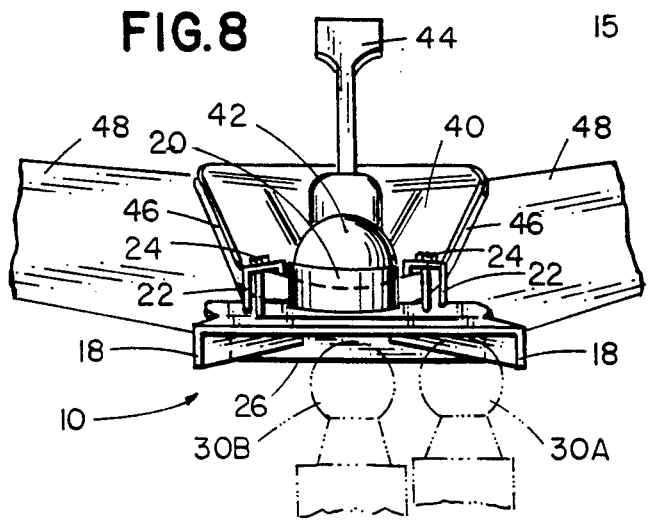

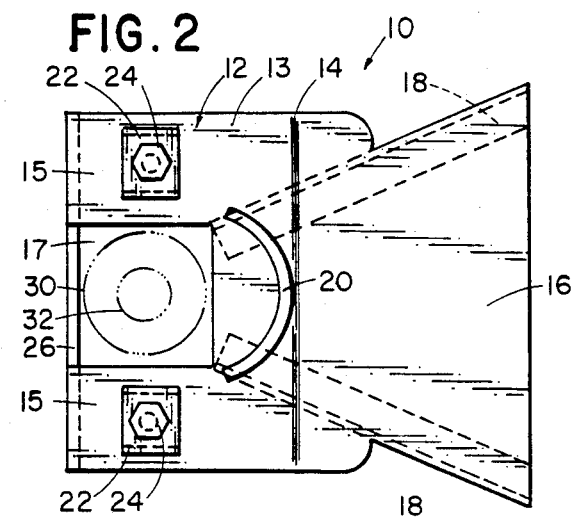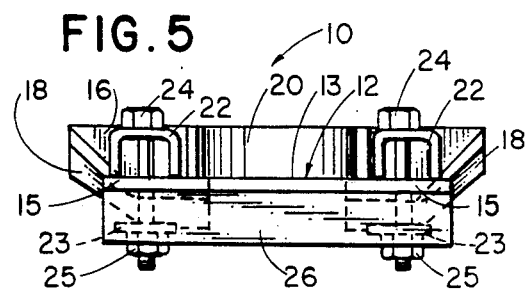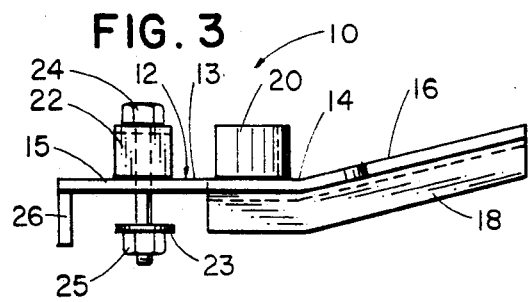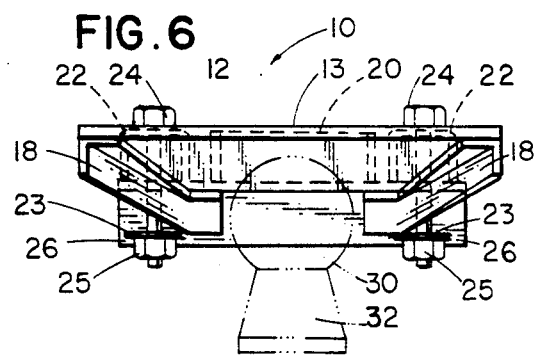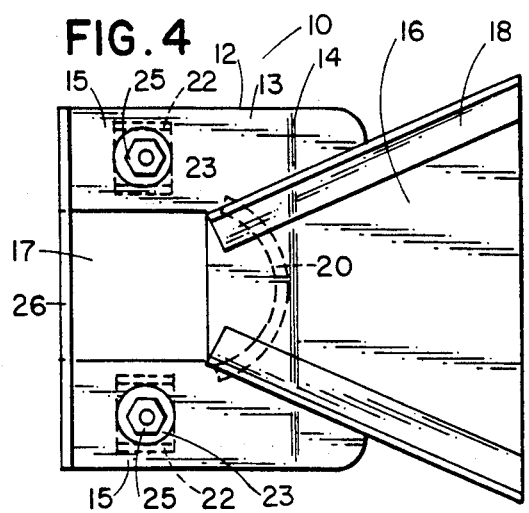

TRAILER COUPLING GUIDE

TECHNICAL FIELD

This invention relates, generally, to a trailer hitch guiding device. More particularly, it relates to a trailer hitch guiding device that permits a driver of a vehicle to back up and align the hitch ball attached to the vehicle with the socket of the trailer coupling member in the absence of a second individual to direct and guide said driver.

BACKGROUND ART

As is well known in the art, even with the assistance of a second individual to guide and direct the driver of a towing vehicle to precisely place the hitch ball on the vehicle in alignment with and directly under the socket on the trailer member can be a long and frustrating experience. The coupling elements (i.e. hitch ball and socket) are not normally visible from the driver's seat, especially during the final increments of movement of the vehicle as it is being backed towards the trailer for hitching purposes.

This long and frustrating experience is compounded when the coupling operation must be performed without the assistance of a second individual to guide and direct the driver. Thus, this lone driver must resort to the trial and error method wherein the lone driver backs the tow vehicle towards the trailer, and periodically stops the vehicle, and gets out to observe the alignment and position of the hitch ball in relationship to the socket on the trailer tongue. This procedure must be repeated until proper alignment is achieved to place the hitch ball in longitudinal alignment with and directly under the trailer socket on the trailer tongue until the hitching process is completed. Dim light, inclement weather, uneven terrain and other distractions compound this trial and error procedure to effect a hitching operation by a lone individual.

Earlier devices for guiding the backing of a vehicle are disclosed in U.S. Pat. Nos. 3,765,703, 4,199,756, 2,984,011 and 3,418,628. However, many of the prior guiding devices of the indicated character are relatively cumbersome, complicated, costly and may require special skills and mechanical knowledge to install, maintain and operate.

Consequently there is a need for a trailer coupling guide that will overcome the aforementioned problems, but the prior art, taken as a whole in accordance with the requirements of law, neither teaches nor suggests how the hitching procedure could be improved.

DISCLOSURE OF INVENTION

The novel device is clamped by any suitable means, such as nuts and bolts, onto a trailer tongue coupling, at the leading end thereof. The device includes a flat main body plate and a slightly upwardly angled deflection plate, integral to said main body plate, that has a wide leading end and a narrow trailing end. The deflection plate thus has a generally "V"-shaped appearance when seen in plan view and a transversely disposed line of demarcation is formed in the device between the main body plate and the deflection plate.

An elongate guide member of linear configuration depends from each laterally opposite edge of the deflection plate; thus, the guide members converge toward one another from the leading end of the deflection plate to the trailing end thereof and guide the hitch ball toward a receptor opening in the device that is formed adjacent to the trailing end of the main body plate. The receptor opening is in registration with the socket formed in the trailer tongue coupling so that the hitch ball extends upwardly through the opening and into the socket under the influence of the vehicle's springs. Those springs are compressed as the hitch ball is driven downwardly during the backing procedure and are at least slightly released when the hitch ball extends into the socket.

An arcuate flat plate having a transverse extent substantially equal to the transverse extent of the receptor opening is mounted on the upper side of the main body plate between the receptor opening and the deflection plate, and serves to position the trailer tongue coupler with respect to the device. A transversely disposed stop plate depends from the trailing end of the main body plate to limit the rearward travel of the hitch ball.

The present invention is intended, but not by way of limitation, for use in connection with relatively large or heavy trailers, such as those associated with the recreation field, that cannot be easily manually moved to align the aforementioned hitch ball and socket member.

A major object of the present invention is to provide a device that will substantially eliminate the often long and frustrating inconveniences suffered by a lone individual attempting to place a small round hitch ball in alignment with the socket opening on a trailer tongue without the assistance of a second person.

Another object of the present invention is to provide a light-in-weight, portable, and compact device that requires no special skills or mechanical knowledge to connect to or remove from the trailer tongue.

Still another object is to provide a device that is durable, economical to manufacture, and that requires no complicated assembly or maintenance.

The invention accordingly comprises the features of construction, combination of elements and arrangement of parts that will be exemplified in the construction set forth hereinafter and the scope of the invention will be set forth in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a perspective view of an exemplary embodiment of the invention as attached to a trailer tongue. A conventional hitch ball device attached to a towing vehicle is also shown;

FIG. 2 is a top plan view of said embodiment;

FIG. 3 is a side elevational view thereof;

FIG. 4 is a bottom plan view thereof;

FIG. 5 is trailing end view thereof;

FIG. 6 is leading end view thereof;

FIG. 7 is a top plan view of said embodiment, attached to a trailer tongue, with a hitch ball in phantom lines approaching the novel device; and FIG. 8 is a front elevational view of said embodiment attached to a trailer tongue, with a hitch ball shown in phantom lines as it approaches said embodiment.

BEST MODES FOR CARRYING OUT THE INVENTION

Referring now to FIG. 1, it will there be seen that an exemplary embodiment of the present invention is denoted as a whole by the reference numeral 10.

Main body plate 12 (with arrow) has a generally horizontal part 13, a braked crease 14, and an angled part 16 that extends forwardly of the trailer tongue. The angled part 16 is somewhat "V"-shaped, flaring outwardly at its forward end; it is referred to hereinafter as the deflection plate 16. A pair of angles 18 are welded or otherwise secured to the bottom thereof, conforming to the "V"-shape. The rearward part 13 of the main body plate 12 is bifurcated, having two extensions 15 that extend below the lips 46 of trailer tongue coupling 40.

Clamps 22, including bolts 24, washers 23 and nuts 25, are fastened over the lips 46 of the tongue coupling 40 as best shown in FIGS. 1, 7 and 8. An upstanding arcuate flat bar or positioning means 20 is welded to the upper side of the horizontal part 13 and is designed to fit snugly against the frontal lip 45 forward of the coupling socket 42 to ensure the proper fit and stabilization of the device to conventional hitch coupling 40. Stop plate 26 is a transversely disposed flat bar welded across the underside of the bifurcated legs 15; it precludes hitch ball 30 from being backed past the opening 17, seen in FIGS. 2 and 4, and gives the driver a tangible stop point in the backing procedure.

FIGS. 1, 7 and 8 illustrate stages of backing a vehicle into the guiding apparatus 10. In FIG. 7, stages 30A, 30B and 30C of the hitch ball 30 are shown approaching off-center and being guided towards receptor opening 17. Also shown are the coupling socket 42, latch 44 (in locked position) coupling 40 and lips 45 and 46 of the coupling 40.

FIG. 8 shows a front end view of stages of a hitch ball 30A and 30B approaching coupling 40 with the trailer tongue 48 visible.

FIG. 1 depicts a towing vehicle 34 with hitch device 31, hitch ball 30 with tapered neck 32 being backed towards device 10 which is affixed to the trailer coupling 40 and the trailer tongue 48, said tongue coupling having an integrally mounted jack 50 to make any vertical adjustments required to allow the top of the hitch ball 30 to come in contact with the underside of the deflection plate 16 and between the angled guide members 18.

As the vehicle is backed with hitch ball 30 in position, the springs of vehicle 34 are compressed, i.e., forced downwardly to allow hitch ball 30 to be guided into alignment with the longitudinal axis of symmetry of the trailer socket 42.

As vehicle 34 is backed toward tongue coupling 40, deflection plate 16 guides and deflects the errant hitch ball 30 downwardly and into alignment with opening 17, thereby causing hitch ball 30 to "pop" into the socket 42 to complete the coupling operation. Thus, the bottom surface of deflection plate 16 slideably engages an upper surface of the hitch ball, and thereby drives said hitch ball downwardly.

This invention is clearly new and useful. Moreover, it was not obvious to those of ordinary skill in the art at the time it was made, in view of the prior art when considered as a whole.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A device that facilitates connection of a hitch ball and a socket adapted to receive the hitch ball, comprising:
   a generally flat main body plate;
   an upwardly angled deflection plate, integral with said main body plate for slideably engaging said hitch ball and driving said hitch ball downwardly;
   said deflection plate having a bottom surface that slideably engages an upper surface of said hitch ball;
   said deflection plate having a leading end and a trailing end, said leading end having a greater transverse extent than said trailing end;
   a pair of guide members depending from laterally opposite edges of said deflection plate, said guide members accordingly being disposed in converging relation to one another;
   a receptor opening, adapted to receive said hitch ball, formed in said main body plate, adjacent a trailing end of said deflection plate;
   whereby said hitch ball is driven downwardly by said deflection plate and is guided into said receptor opening by said guide members when a vehicle, to which said hitch ball is attached, travels in reverse, said deflection plate effecting compression of said vehicle's springs as said hitch ball travels rearwardly, said springs urging said hitch ball upwardly through said receptor opening and into said socket when said hitch ball travels beyond said trailing end of said deflection plate.

2. The device of claim 1, further comprising a transversely disposed stop plate that depends from a trailing end of said main body plate and that stops rearward travel of said hitch ball.

3. The device of claim 2, further comprising positioning means for positioning said device relative to a trailer tongue coupling.

4. The device of claim 3, wherein said positioning means is an arcuate flat bar mounted atop said main body plate, centrally thereof, forwardly of said receptor opening and rearwardly of said deflection plate.

5. The device of claim 4, wherein said positioning means has a predetermined transverse extent substantially equal to the transverse extent of said receptor opening.

6. The device of claim 5, further comprising attachment means for releasably clamping said device to a trailer tongue, said attachment means including a pair of clamp members positioned in transversely spaced relation to one another on opposite sides of said receptor opening, said clamp members adapted to engage an associated lip member formed on said trailer tongue coupling.

7. The device of claim 6, further comprising a transversely disposed crease between said main body plate and said deflection plate.

8. The device of claim 7, wherein each of said clamp members further include a bolt member, and nut means associated therewith, that extends through a bolt-receiving aperture formed in said main body plate so that tightening of said bolt member clamps said device to said trailer tongue coupling.

* * * * *